(12) United States Patent
Contreras

(10) Patent No.: US 7,955,544 B2
(45) Date of Patent: Jun. 7, 2011

(54) SURFACE SHAPING OF COMPRESSIBLE CELLULAR POLYMERS WITH CONTINUOUS ROTARY METHOD

(75) Inventor: Jose D. Contreras, West Covino, CA (US)

(73) Assignee: Foamex Innovations Operating Company, Media, PA (US)

( * ) Notice: Subject to any disclaimer, the term of this patent is extended or adjusted under 35 U.S.C. 154(b) by 1247 days.

(21) Appl. No.: 10/997,041

(22) Filed: Nov. 23, 2004

(65) Prior Publication Data

US 2006/0107806 A1    May 25, 2006

(51) Int. Cl.
| B29C 49/00 | (2006.01) |
| B29C 67/20 | (2006.01) |
| B29C 55/18 | (2006.01) |
| B29C 37/00 | (2006.01) |
| A01J 21/02 | (2006.01) |
| A01J 21/00 | (2006.01) |
| A47C 17/00 | (2006.01) |

(52) U.S. Cl. ....... 264/284; 264/46.3; 264/280; 264/160; 425/299; 425/331; 425/362; 5/690

(58) Field of Classification Search ............... 264/284, 264/280, 46.3, 160; 425/331, 362, 299; 5/690
See application file for complete search history.

(56) References Cited

U.S. PATENT DOCUMENTS

| 2,902,091 A | 9/1959 | Dahle |
| 3,186,271 A | 6/1965 | Kaiser |
| 3,431,802 A | 3/1969 | Schulpen |
| 3,690,203 A | 9/1972 | Huttemann |
| 3,730,031 A | 5/1973 | Huttemann |
| 4,700,447 A | 10/1987 | Spann |
| 5,477,573 A | 12/1995 | Bonaddio et al. |
| 5,534,208 A | 7/1996 | Barr et al. |
| 5,666,682 A * | 9/1997 | Bonaddio et al. ................. 5/736 |
| 5,688,538 A | 11/1997 | Barr et al. |
| 5,749,993 A | 5/1998 | Denney et al. |
| 5,913,765 A * | 6/1999 | Burgess et al. ............... 493/403 |
| 6,513,414 B1 | 2/2003 | Denney et al. |
| 2005/0173826 A1* | 8/2005 | DeFranks et al. ............. 264/138 |

FOREIGN PATENT DOCUMENTS

| BE | 551358 | 10/1956 |
| CA | 714 887 | 8/1965 |
| DE | 33 10 921 | 9/1984 |
| DE | 90 10 105 U1 | 10/1990 |
| FR | 1 328 105 | 4/1963 |
| FR | 1 336 014 | 7/1963 |

* cited by examiner

Primary Examiner — Monica A Huson
Assistant Examiner — Michael T Piery
(74) Attorney, Agent, or Firm — Connolly Bove Lodge & Hutz LLP

(57) ABSTRACT

Apparatus and methods for cutting compressible cellular polymers such as polyurethane foam, are characterized by a first die roller and a pressure roller, wherein both rollers define raised portions separated by recesses or depressions, and the raised portions on the first die roller register with the recesses of the pressure roller at a nip formed between the rollers. Portions of the polymer material extruded into the spaces between the raised portions of the first die roller are cut away, such that the cut product conforms substantially to the surface geometry of the first die roller, and the depth of cut is greater than with prior rotary cutting methods.

21 Claims, 2 Drawing Sheets

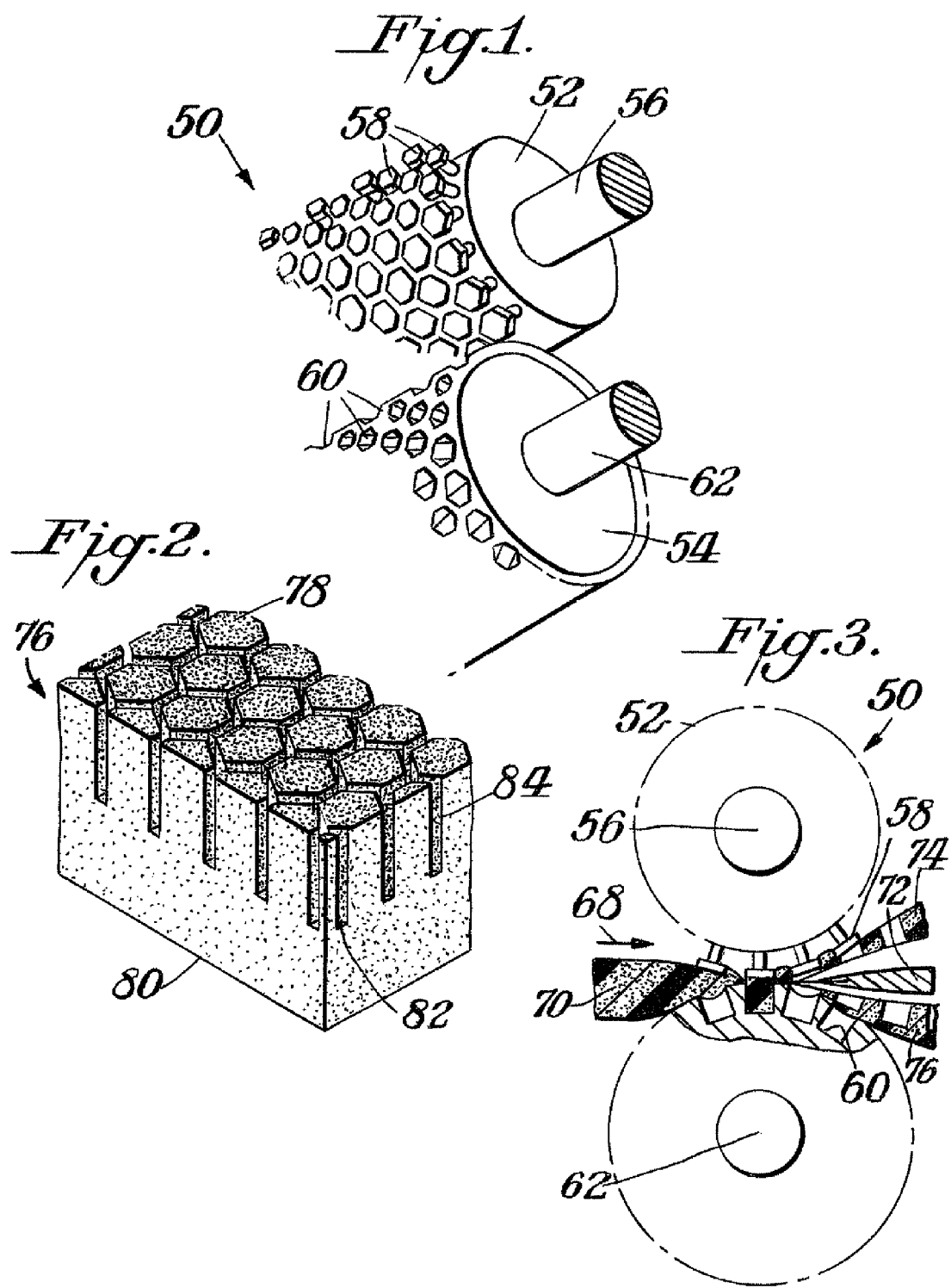

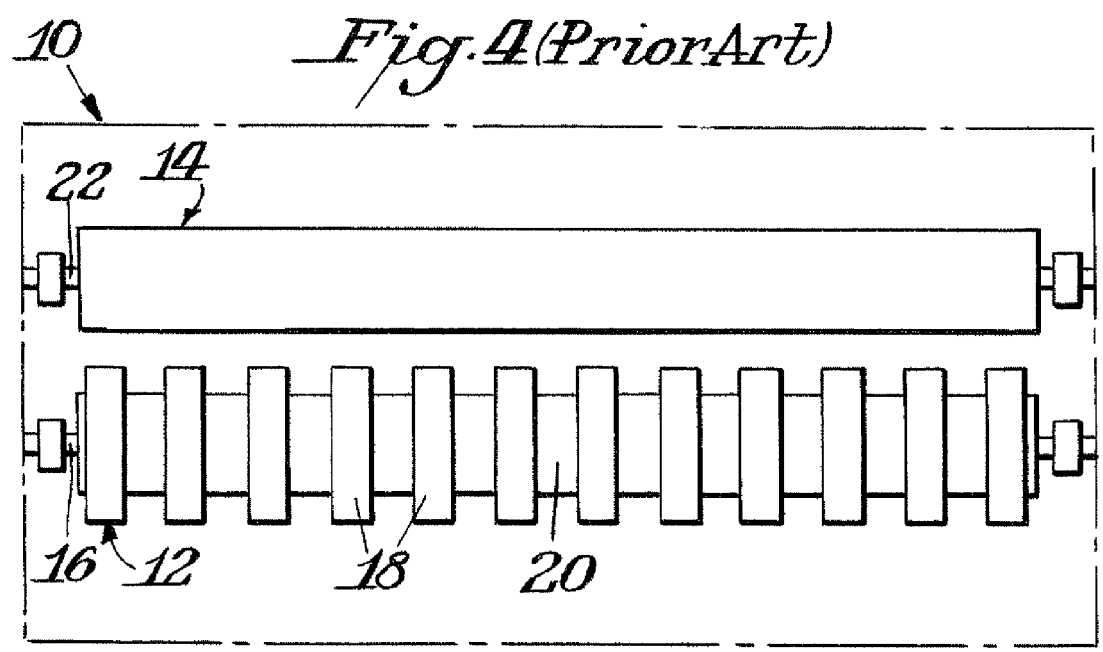

SURFACE SHAPING OF COMPRESSIBLE CELLULAR POLYMERS WITH CONTINUOUS ROTARY METHOD

FIELD OF THE INVENTION

The present invention relates to apparatus and methods for continuously shaping the surface of a slab of compressible or cellular polymer material, such as polyurethane foam. A blade cuts portions of the compressible material from the surface of the slab after the slab has been compressed between complementary patterned surfaces, such as die rollers. The concurrent positive and negative compression imparted by the surfaces on the compressible material results in particularly desirable deeper vertical cut surfaces with flattened valleys or troughs.

BACKGROUND OF THE INVENTION

Several methods and apparatus for cutting slabs of cellular polymer materials have been disclosed in the prior art. Of particular interest is U.S. Pat. No. 5,534,208 (Barr). This patent discloses a continuous rotary method for surface shaping synthetic foams in which the foam is compressed between a smooth compression roller and a die roller having raised and recessed portions. The portions of the foam extruded into the recesses in the die roller are cut away by a blade. The compressed foam portions return to an uncompressed state after passing through the rollers. As a result, a mirror-image pattern to the pattern on the surface of the die roller is cut on the surface of the foam. It can be difficult to produce troughs with flattened bottom surfaces using this rotary method. Moreover, the depth of cut is proportionate to the die roller pattern depth. See also, U.S. Pat. No. 5,688,538.

Heretofore, it has been difficult to form foam parts having deep cut portions, e.g., up to 80% of the thickness of the foam slab, using the continuous cutting method of the '208 patent. Such deep cut portions with relatively straight and relatively vertical side walls are also difficult to process. Thus, apparatus and methods for producing such foam parts are desired.

SUMMARY OF THE INVENTION

In a first aspect, a sheet or pad of a cellular polymer material, such as a foam, having a three-dimensional shaped support surface with raised portions separated by depressions is formed by pressing a slab of the cellular polymer material that has a planar surface into a nip formed between a die having a cylindrical die surface with raised die portions separated by die depressions and a pressure roller parallel to said die surface. The pressure roller defines recesses of complementary shape to said raised die portions wherein each recess substantially registers with a respective raised die portion at the nip. Each raised die portion may nest into the respective registered recess in the pressure roller. At least one of said die and said pressure rollers is turned. Some portions of the cellular polymer material are compressed against said raised die portions to a reduced thickness and other portions of the cellular polymer material are extruded into said die depressions. The extruded portions are then cut away by a blade.

Preferably, the cutting blade is positioned in a cutting plane substantially tangent to the cylindrical die surface. The resulting pad then has raised portions separated by depressions in which the raised portions have substantially vertical side walls. In addition, the resulting pad has raised portions separated by depressions in which the depressions have substantially planar bottom surfaces.

In a particularly preferred embodiment, the raised portions of the pad have a height that is at least 50%, more preferably at least 80%, of the thickness of the pad.

In a second aspect, an apparatus for forming a sheet or pad of a cellular polymer material, such as a foam, having a three-dimensional shaped support surface with raised portions separated by depressions includes a die having a cylindrical die surface with raised die portions separated by die depressions and a pressure roller parallel to said die surface. The pressure roller defines recesses of complementary shape to said raised die portions wherein each recess substantially registers with a respective raised die portion at a nip formed by the die roller and the pressure roller. Each raised die portion may nest into the respective registered recess in the pressure roller. At least one of said die and said pressure rollers is turned. Some portions of the cellular polymer material are compressed against said raised die portions to a reduced thickness and other portions of the cellular polymer material are extruded into said die depressions. The extruded portions are then cut away by a blade.

DESCRIPTION OF THE FIGURES

Numerous other objects, features and advantages of the invention shall become apparent upon reading the following detailed description taken in conjunction with the accompanying drawings, in which:

FIG. 1 is a detailed perspective view of a roller assembly according to the invention including a first die roller with projections separated by recesses and a pressure roller with recesses that register with the projections of the first die roller at the nip formed between the rollers;

FIG. 2 is a perspective view showing a corner of a shaped surface of a foam pad made using the roller assembly of FIG. 1;

FIG. 3 is a longitudinal section view of a rotary cutting apparatus including a roller assembly according to the invention; and FIG. 4 is a side elevational view of a background art rotary cutting apparatus with a smooth compression roller and a die roller, such as in U.S. Pat. No. 5,534,208.

DESCRIPTION OF THE PREFERRED EMBODIMENTS

With reference to the drawings in which like numerals designate similar elements, FIG. 4 shows a prior art rotary cutting apparatus 10 having a patterned die roller 12 and a compression roller 14. The patterned die roller 12 is mounted for rotation on a shaft 16. The patterned die roller 12 frequently is formed by mounting a series of rings 18 over a cylindrical roller 20. As shown in FIG. 4, the rings 18 have smooth outer circumferential surfaces and each ring is spaced apart from an adjacent ring at a regular interval. It is also known in the art to form the rings with other than smooth outer circumferential surfaces, or to alternate rings with different configurations at regular or irregular intervals.

The compression roller 14 is mounted for rotation on shaft 22. The compression roller 14 may be indexed so that its circumferential surface is closer to or farther away from the outer circumferential surfaces of the rings 18 forming the die roller 12. In this way, the nip between the compression roller and the die roller may be varied. The shafts 16, 22 are mounted for rotation to a supporting structure, such as a housing (indicated by phantom outline in FIG. 4). Either, but frequently both, shafts are driven by rotational motors (not shown).

A cutting blade (not shown) is installed so as to cut a slab of compressible material just as it emerges from the nip between the compression roller and the die roller. Referring to FIG. 4, the blade edge would be positioned generally parallel to shafts 16, 22.

Referring now to FIG. 1, an apparatus 50 according to one embodiment of the invention is shown in perspective view. A first patterned die roller 52 is formed by a series of raised projections 58 with upper surfaces that together define an outer circumferential die surface for patterned die roller 52. The raised projections 58 are spaced apart to define gaps therebetween. In the embodiment shown in FIG. 1 the raised projections 58 each have generally planar upper surfaces, and such surfaces terminate at generally planar side surfaces to form a regular geometric shape, such as a hexagon. As shown in FIG. 1, the planar hexagonal end surfaces of the raised projections 58 are arranged in a honey-comb like regular pattern so that each projection is spaced from six adjacent similar projection by a slot recess of relatively constant width between each of the six sides of the hexagonal projection. That is, each side of a hexagonal projection is parallel to and spaced from a side of an adjacent hexagonal projection.

While a honey-comb like regular pattern with hexagonal-shaped raised projections has been shown in FIG. 1, the invention is not intended to be limited to projections with such shape. Other regular shaped raised projections, such as circular, triangular, square, diamond, heptagon, septagon, octagon, and so on, as well as any irregularly-shaped raised projections, are also contemplated.

The die surface of the first die roller may be constructed either by machining a solid cylindrical roller body or by axially assembling a number of die rings on the roller shaft, each die ring carrying one circumferential row of die elements. The diameter, thickness and orientation of each ring may be varied to vary the shape of the cut product to be produced by the rotary cutting apparatus. The constructions of the die rollers shown in U.S. Pat. No. 5,534,208 are illustrative, and are incorporated by reference.

The first die roller 52 is mounted for rotation on shaft 56. Shaft 56 is positioned in parallel with shaft 62. If rings are used to form the die roller pattern surface, such rings may be attached to the roller with set screws. Holes may be tapped in an inner groove surface to receive the set screws. Other suitable attachment means may be used.

A pressure roller, which may be a second die roller 54, is mounted for rotation on shaft 62. The pressure roller 54 defines recesses 60 in its outer circumferential surface. Such recesses 60 for the embodiment illustrated in FIG. 1, each are hexagonal and are arranged in a regular honey-comb like pattern so as to register with the raised projections 58 of the first die roller 52 at the nip formed between the first and second die rollers 52, 54. The die surface of the second die roller may be constructed either by machining a solid cylindrical roller body or by axially assembling a number of die rings on the roller shaft, each die ring carrying one circumferential row defining recesses 60.

Most preferably, the die roller 52 and pressure roller 54 are formed from one or more materials that are durable, sufficiently hard under compression and will not react with the cellular polymer material to be cut in the rotary cutting apparatus 50. Suitable materials for the first and second rollers 52, 54 include, inter alia, steel and aluminum.

FIG. 3 illustrates the method of three-dimensionally shaping an existing surface of a cellular polymer material slab 70, such as a polyurethane foam pad or slab, according to this invention using the apparatus 50 of FIG. 1. The apparatus 50 has a first die roller 52 and a pressure roller 54 that are mounted on parallel rotary shafts 56, 62, respectively. The shafts are supported in an appropriate machine frame, and at least one of the two shafts is driven for rotation by a suitable motor drive, not shown in the drawings.

The two shafts 56, 62 are spaced apart so that a gap exists between the outer circumferential surfaces of the first and second rollers 52, 54. This gap or nip is substantially smaller than the thickness of the slab 70. Preferably, where the cellular polymer material to be cut is flexible polyurethane foam in a slab with a thickness in the range of 2.5 to 15 cm, the nip spacing between the outer circumferential surfaces of the first and second rollers is from 5 to 75 mm, most preferably from 12 to 50 mm.

As the foam slab 70 is fed into the roller assembly 50 in the direction of arrow 68 shown in FIG. 3, the first die roller 52 acts against the top surface of the slab 70 so that the underside surface of the slab 70 is pressed or extruded into the recesses 60 formed in the pressure roller 54. Concurrently, the outer circumferential surface of the pressure roller 54 acts against the underside surface of the slab 70 to that the top surface of the slab 70 is pressed or extruded into the spaces between the raised projections 58 of the first die roller 52. Just beyond the nip of minimum spacing between the rollers 52, 54, the slab 70 advances against the cutting edge of a blade 72 that is positioned between the rollers 52, 54 in a cutting plane substantially tangent to the outer circumferential surface of the first die roller 52. The blade 72 cuts away those portions of cellular polymer material extruded into the spaces between the raised projections 58, sparing those portions of the cellular polymer material that were extruded into the recesses 60 formed in the second die roller or pressure roller 54. As a result, a scrap sheet 74 is cut away from the surface of the foam slab 70. The scrap sheet 74 consists of the material removed to make recesses in the cut product 76. The scrap sheet 74 has a thickness equal to the depth of the recesses formed in the cut product or pad 76.

In the embodiment of the cutting method shown in FIG. 3, the recesses 60 in the pressure roller 54 register with the projections 58 of the first die roller 52, but the projections 58 do not nest within the recesses 60. Rather, the upper surfaces of the projections 58 register by meeting at the upper opening of the recesses 60. Alternatively, the recesses 60 may be formed of a size larger than the projections 58 to receive the projections 58 within the recesses 60. In such alternate embodiment (not shown), an individual projection 58 nests within a respective individual recess 60 as the projections and recesses register at the nip between rollers 52, 54.

FIG. 2 shows one corner of the shaped support surface of a pad 76 obtained by a cutting method as shown schematically in FIG. 3. The three-dimensionally shaped surface is substantially a mirror image of the die surface of the first die roller 52. The shaped surface includes raised support elements 78 which are hexagonal right angle prisms perpendicular to the flat bottom or under surface 80 of the pad. Each support element has a generally planar top surface bounded by six side edges and six substantially vertical sides 84 extending between the end surface and slot bottom 82. The slot bottom surface 82 is generally planar and parallel to the underside of the foam pad, and defines a common bottom for the depressions which separate the individual support elements 78. The depressions collectively define a hexagonal grid, i.e., a network consisting of hexagonal slots joined side to side over the entire shaped surface of the support pad.

As is apparent from FIG. 2, the fraction of the shaped support surface occupied by the end surfaces of the support elements 78 is much greater than the fraction occupied collectively by the slots 82, i.e., by the total area of the bottom surface. This unequal proportion better distributes the weight of a body of a person reclining on the support surface. The end surfaces form a relatively large support surface while the relatively narrow slots 82 help to increase ventilation between the individual support elements to dissipate excessive moisture or humidity and heat. The support elements are free to respond and adapt individually to the localized pressure and contour of the person's anatomy contacting each support surface.

As an improvement over the cut support structures shown in U.S. Pat. No. 5,534,208, the slots 82 in the shaped support surface can be much deeper, while the slot bottom surface remains generally planar. Whereas the cut depth of the slots shown in FIG. 4 in the '208 patent is only a minor fraction of the thickness of the foam pad, in the present invention, the cut depth of the slots is greater than about 50% of the thickness, and can be as much as up to about 80% of the thickness, of the foam pad. Notwithstanding the greater cut depth, the side wall surfaces 84 are substantially vertical, and the trough or slot bottom surface is generally planar.

While preferred embodiments of the invention have been described and illustrated here, various changes, substitutions and modifications to the described embodiments will become apparent to those of ordinary skill in the art without thereby departing from the scope and spirit of the invention.

I claim:

1. A method for making a sheet or pad of a cellular polymer material having a three-dimensional shaped support surface with raised portions separated by depressions by pressing one slab of the cellular polymer material that has a planar surface into a nip formed between a die having a cylindrical die surface with raised die portions separated by die depressions and a pressure roller parallel to said die surface, said pressure roller having an outer circumferential surface, turning at least one of said die and said pressure roller, compressing some portions of the cellular polymer material against said raised die portions to a reduced thickness and extruding other portions of the cellular polymer material into said die depressions, and cutting away said other portions, characterized in that:

the die has a length and a circumference, and the raised die portions are in multiple first rows along the length wherein each first row extends around the circumference of the die and comprises a plurality of discrete raised die portions and the raised die portions have face surfaces with an outer periphery defining a geometric shape, and wherein the each of the raised die portions also is in one of a multiple of second rows that extend along the length of the die, with each such second row containing three or more raised die portions, and the pressure roller has a length and defines a plurality of recesses in its outer circumferential surface that are in multiple first rows and multiple second rows along the length, wherein each first row extends around the circumference of the pressure roller and comprises a plurality of discrete recesses, with each recess having a perimeter of identical or substantially identical shape and size to the outer periphery of a respective one of said raised die portions, wherein each recess also is in one of the multiple second rows that extend along the length of the pressure roller, with each such second row containing three or more recesses, wherein each recess substantially registers with the respective raised die portion at the nip so that the outer periphery of each face surface is in alignment with the perimeter of the respective recess with which it is substantially registered, and wherein cutting away said other portions is with a blade positioned in a cutting plane substantially tangent to the cylindrical die surface.

2. The method of claim 1, wherein each raised die portion of the die registers with but does not nest within a respective recess in the pressure roller.

3. The method of claim 1, wherein each raised die portion of the die registers with and nests within a respective recess in the pressure roller.

4. The method of claim 1, wherein the pad has raised portions separated by depressions in which the raised portions have substantially vertical side walls.

5. The method of claim 1, wherein the pad has raised portions separated by depressions in which the depressions have substantially planar bottom surfaces.

6. The method of claim 1, wherein the cellular polymer material is foam.

7. The method of claim 1, wherein the raised portions of the pad have a height that is at least 50% of the thickness of the pad.

8. The method of claim 1, wherein the raised portions of the pad have a height that is at least 80% of the thickness of the pad.

9. The method of claim 1, wherein the die defines an outer circumference and the length of the slab is greater than the outer circumference of the die.

10. A method for making a sheet or pad of a cellular polymer material having a three-dimensional shaped surface with raised portions separated by depressions, comprising:

(a) pressing one slab of the cellular polymer material that has a planar surface into a nip formed between (i) a die having a length and a circumference and having a cylindrical die surface with raised die portions separated by die depressions wherein the raised die portions are in multiple first rows along the length wherein each first row extends around the circumference of the die and comprises a plurality of discrete raised die portions with face surfaces with an outer periphery defining a geometric shape, and wherein the each of the raised die portions also is in one of a multiple of second rows that extend along the length of the die, with each such second row containing three or more raised die portions, and (ii) a pressure roller parallel to said die surface, wherein the pressure roller has a length and a circumference and has a substantially smooth outer cylindrical surface and defines recesses that are in multiple first rows and multiple second rows along the length, wherein each first row extends around the circumference of the pressure roller and comprises a plurality of discrete recesses, with each recess having a perimeter of identical or substantially identical shape and size to a respective one of the face surfaces of one of said raised die portions, wherein each recess also is in one of the multiple second rows that extend along the length of the pressure roller, with each such second row containing three or more recesses, and wherein each recess substantially registers with the one respective raised die portion at the nip so that the outer periphery of each face surface is in alignment with the perimeter of a respective recess with which it is substantially registered;

(b) turning at least one of said die and said pressure roller;

(c) compressing some portions of the cellular polymer material against said raised die portions to a reduced thickness and extruding other portions of the cellular polymer material into said die depressions; and (d) cutting away said other portions with a blade positioned in a cutting plane substantially tangent to the cylindrical die surface.

11. The method of claim 10, wherein the cellular polymer material is foam.

12. The method of claim 10, wherein each raised die portion of the die registers with but does not nest within a respective recess in the pressure roller.

13. The method of claim 10, wherein each raised die portion of the die registers with and nests within a respective recess in the pressure roller.

14. The method of claim 10, wherein the pad has raised portions separated by depressions in which the raised portions have substantially vertical side walls.

15. The method of claim 10, wherein the pad has raised portions separated by depressions in which the depressions have substantially planar bottom surfaces.

16. The method of claim 10, wherein the raised portions of the pad have a height that is at least 50% of the thickness of the pad.

17. The method of claim 10, wherein the raised portions of the pad have a height that is at least 80% of the thickness of the pad.

18. The method of claim 1, wherein the raised die portions have face surfaces of regular geometric shapes.

19. The method of claim 10, wherein the raised die portions have face surfaces of regular geometric shapes.

20. The method of claim 1, wherein the raised portions of the pad define end surfaces, and said end surfaces occupy an area much greater than an area occupied by depressions in the shaped surface of the pad.

21. The method of claim 10, wherein the raised portions of the pad define end surfaces, and said end surfaces occupy an area much greater than an area occupied by depressions separating said raised portions in the shaped surface of the pad.

* * * * *